United States Patent
Narayanaswamy et al.

(10) Patent No.: US 10,630,535 B2
(45) Date of Patent: Apr. 21, 2020

(54) NOTIFICATION TIMING FOR ELECTRONIC DEVICES

(71) Applicant: QUALCOMM Incorporated, San Diego, CA (US)

(72) Inventors: Ashokkumar Narayanaswamy, Hyderabad (IN); Amandeep Singh Bedi, Hyderabad (IN); Shankar Anand, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 67 days.

(21) Appl. No.: 15/985,330

(22) Filed: May 21, 2018

(65) Prior Publication Data

US 2019/0356534 A1   Nov. 21, 2019

(51) Int. Cl.
*H04L 12/24* (2006.01)
*H04L 12/18* (2006.01)
*H04L 29/08* (2006.01)
*H04L 12/58* (2006.01)

(52) U.S. Cl.
CPC ...... *H04L 41/0627* (2013.01); *H04L 12/1895* (2013.01); *H04L 41/0622* (2013.01); *H04L 51/24* (2013.01); *H04L 67/22* (2013.01)

(58) Field of Classification Search
None
See application file for complete search history.

(56) References Cited

U.S. PATENT DOCUMENTS

| | | | | |
|---|---|---|---|---|
| 7,899,867 B1* | 3/2011 | Sherstinsky | ............ | H04L 51/04 709/203 |
| 8,615,221 B1* | 12/2013 | Cosenza | ................. | H04M 3/42 455/414.1 |
| 8,949,363 B2* | 2/2015 | Gray | ....................... | H04L 51/24 709/207 |
| 9,648,118 B1* | 5/2017 | Jachner | ................... | H04L 67/24 |
| 9,775,009 B2 | 9/2017 | Bendi et al. | | |

(Continued)

FOREIGN PATENT DOCUMENTS

WO    WO-2007114451 A1 * 10/2007   ........... H04L 63/104
WO    2015160157 A1    10/2015

OTHER PUBLICATIONS

Anonymous: "Space—by Boundless Mind", Retrieved from the Internet: http://youjustneedspace.com/, Apr. 24, 2018, pp. 1-3.

(Continued)

*Primary Examiner* — Scott B Christensen
(74) *Attorney, Agent, or Firm* — Moore IP/Qualcomm Incorporated

(57) ABSTRACT

A method of operation of a first device associated with a first user includes sending a communication to a second device associated with a second user. The communication is sent in response to detecting one or more conditions associated with delaying one or more notifications at a plurality of devices that includes the first device and the second device. The communication is associated with a timing window during which the one or more notifications are to be delayed. The method further includes delaying, during the timing window, generation of a first notification at the first device. The method further includes generating, in response to determining expiration of the timing window, generating the first notification at the first device.

30 Claims, 7 Drawing Sheets

(56) References Cited

U.S. PATENT DOCUMENTS

| | | | | |
|---|---|---|---|---|
| 2005/0210104 | A1* | 9/2005 | Torvinen | G06Q 10/10 709/205 |
| 2007/0016643 | A1* | 1/2007 | Boss | H04L 51/04 709/206 |
| 2007/0049255 | A1* | 3/2007 | Bhakta | H04W 88/02 455/412.2 |
| 2012/0077526 | A1* | 3/2012 | Riffe | H04W 4/50 455/466 |
| 2012/0295645 | A1* | 11/2012 | Yariv | H04L 67/322 455/466 |
| 2012/0311045 | A1* | 12/2012 | Sylvain | H04L 51/12 709/206 |
| 2015/0244854 | A1* | 8/2015 | Babel | H04M 1/66 455/414.1 |
| 2016/0170991 | A1* | 6/2016 | Birchall | G06F 16/24578 707/751 |
| 2017/0094638 | A1 | 3/2017 | Borges et al. | |
| 2017/0154317 | A1* | 6/2017 | Bruce | G06Q 10/1097 |

OTHER PUBLICATIONS

Brody J.E., "Hooked on Our Smartphones—The New York Times", Jan. 9, 2017, Retrieved from the Internet: https://www.nytimes.com/2017/01/09/well/live/hooked-on-our-smartphones.html, 4 pages.
Wolf A., "Motorola Is Staging a Smartphone Intervention—Twice", Feb. 25, 2018, Retrieved from the Internet: https://www.twice.com/product/motorola-staging-smartphone-intervention-amid-mobile-imbalance, pp. 1-4.

* cited by examiner

NOTIFICATION TIMING FOR ELECTRONIC DEVICES

I. FIELD

This disclosure is generally related to electronic devices and more particularly to electronic devices that generate message notifications.

II. DESCRIPTION OF RELATED ART

Electronic devices are increasingly interactive with users and other devices. For example, a user of a mobile device may receive notifications related to text messages, emails, social media activity, and other messages.

In some circumstances, notifications generated at devices may be disruptive. For example, notifications generated at devices may interrupt a business or social activity. As a result, business productivity and personal relations may suffer.

Certain devices enable users to mute notifications. For example, an operating system of a phone may enable a user to mute notifications by turning the phone to a "silent" mode of operation. In some cases, a user may forget to activate (or deactivate) the silent mode, leading to unwanted notifications (or missed notifications).

III. SUMMARY

In an illustrative example, a method of operation of a first device associated with a first user includes sending a communication to a second device associated with a second user. The communication is sent in response to detecting one or more conditions associated with delaying one or more notifications at a plurality of devices that includes the first device and the second device. The communication is associated with a timing window during which the one or more notifications are to be delayed. The method further includes delaying, during the timing window, generation of a first notification at the first device. The method further includes generating, in response to determining expiration of the timing window, the first notification at the first device.

In another example, an apparatus includes a memory configured to store instructions at a first device associated with a first user. The apparatus further includes a processor configured to execute the instructions at the first device to initiate a transmission to a second device associated with a second user. The transmission is initiated in response to detecting one or more conditions associated with delaying one or more notifications at a plurality of devices that includes the first device and the second device. The transmission is to send a communication to the second device, and the communication is associated with a timing window during which the one or more notifications are to be delayed. The processor is further configured to delay, during the timing window, generation of a first notification at the first device and to generate, in response to determining expiration of the timing window, the first notification at the first device.

In another example, a computer-readable medium stores instructions executable by a processor to initiate, perform, or control operations. The operations include sending a communication from a first device associated with a first user to a second device associated with a second user. The communication is sent in response to detecting one or more conditions associated with delaying one or more notifications at a plurality of devices that includes the first device and the second device. The communication is associated with a timing window during which the one or more notifications are to be delayed. The operations further include delaying, during the timing window, generation of a first notification at the first device. The operations further include generating, in response to determining expiration of the timing window, the first notification at the first device.

In another example, an apparatus includes means for storing instructions at a first device associated with a first user. The apparatus further includes means for executing the instructions at the first device to initiate a transmission to a second device associated with a second user, for delaying, during a timing window, generation of a first notification at the first device, and for generating, in response to determining expiration of the timing window, the first notification at the first device. The transmission is initiated in response to detecting one or more conditions associated with delaying one or more notifications at a plurality of devices that includes the first device and the second device. The transmission is to send a communication to the second device, and the communication is associated with the timing window during which the one or more notifications are to be delayed.

IV. BRIEF DESCRIPTION OF THE DRAWINGS

V. DETAILED DESCRIPTION

Figure 1:
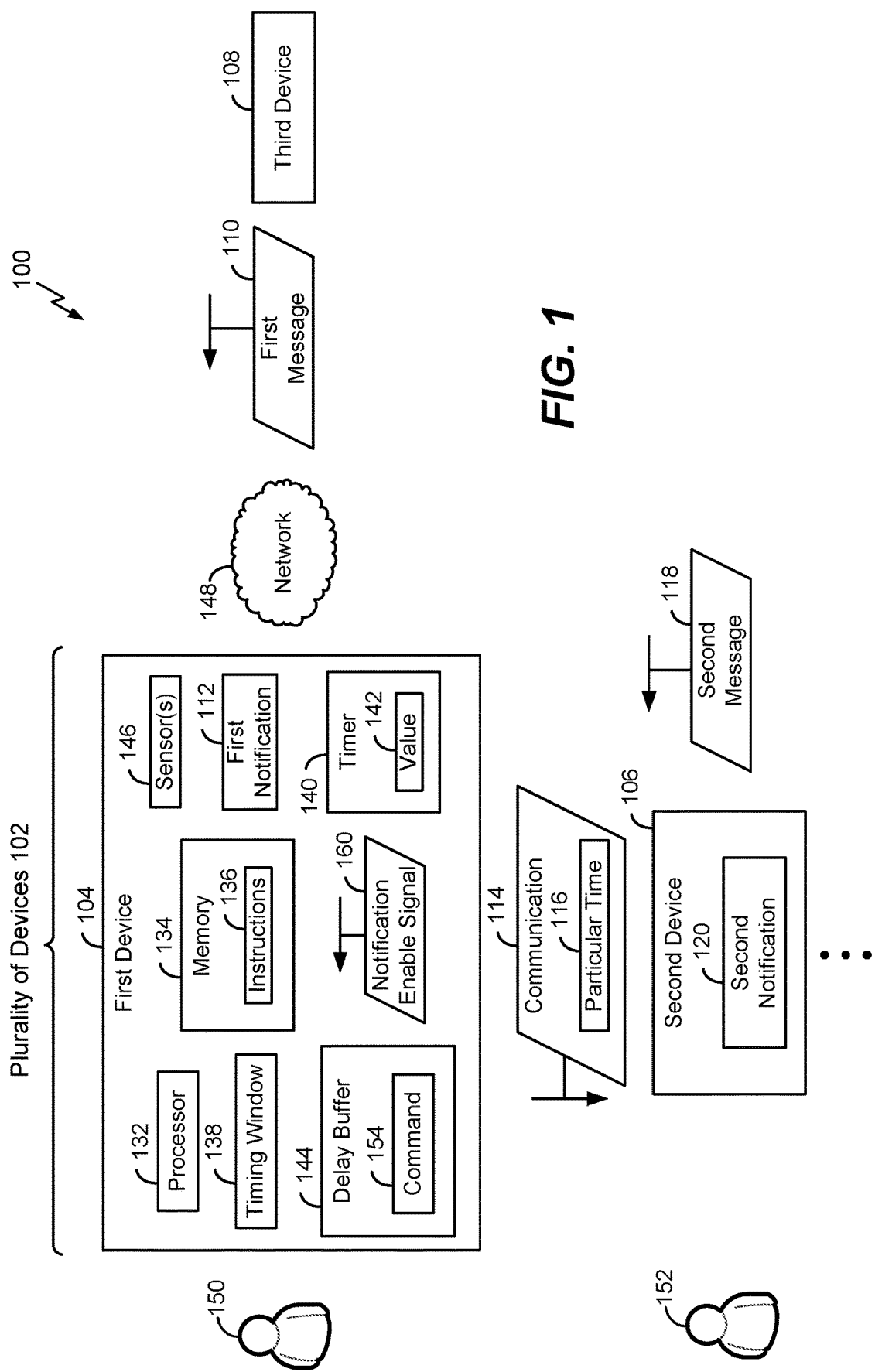
FIG. 1 is a diagram of an illustrative example of a system that is configured to reduce interruption by notifications, such as by delaying (or "suppressing") one or more notifications during a timing window.

Aspects of the disclosure are related to timing (e.g., scheduling or synchronizing) of message notifications at a plurality of devices. For example, the plurality of devices may include devices that are associated with contacts (e.g., friends and family or devices of friends and family), devices that are located in a common geographic region (e.g., a building or a region of a building), or both. The plurality of devices may use one or more timing windows to determine timing of notifications. During a timing window, one or more notifications may be delayed (e.g., "suppressed" or deferred) at the plurality of devices. Upon expiration of the timing window, one or more notifications may be generated at the plurality of devices.

Use of the timing window may be automatically initiated (e.g., triggered) based on one or more conditions. For example, use of the timing window may be initiated in response to detecting (e.g., using a microphone) speech indicating that a user is engaged in an activity, such as a conversation. In this case, the user may wish to avoid interruption by one or more notifications. Alternatively or in addition, use of the timing window may be initiated in response to detecting a social event (e.g., a meal or a meeting based on a particular time of day). The social event may be detected based on "live" information (e.g., from sensors, such as a microphone), as an illustrative example.

In some examples, one or more of the plurality of devices may "extend" the timing window. For example, the timing window may be extended in response to detecting (e.g., using a microphone) speech indicating that a user is engaged in an activity, such as a conversation. Alternatively or in addition, the timing window may be extended in response to detecting a social event (e.g., a meal or a meeting based on a particular time of day). The social event may be detected based on "live" information (e.g., from sensors, such as a microphone), as an illustrative example.

Alternatively or in addition, the plurality of devices may exchange information to determine a duration of the timing window. For example, each of the plurality of devices may receive user input indicating a desired "idle time" period (e.g., a period during which notifications are to be delayed). The plurality of devices may exchange indications of the desired idle time periods. In a particular example, the plurality of devices may select a particular idle time period from among the idle time periods to determine the duration of the timing window. As a non-limiting illustrative example, a first device, a second device, a third device, and a fourth device may indicate idle times of five minutes, ten minutes, fifteen minutes, and zero minutes, respectively. In a particular example, the longest idle time may be selected as the duration of the timing window (e.g., by selecting fifteen minutes as the duration of the timing window). Other illustrative examples are described below with reference to the drawings.

FIG. 1 depicts certain illustrative aspects of an example of a system 100 that is configured to reduce interruption by notifications. For example, the system 100 may be configured to reduce interruption by delaying (or "suppressing") one or more notifications during a timing window 138.

In the example of FIG. 1, the plurality of devices 102 includes a first device 104 and a second device 106. The plurality of devices 102 may include one or more mobile devices (e.g., one or more mobile phones), one or more computer devices (e.g., a laptop computer or a tablet computer), one or more wearable devices (e.g., a "smart watch"), one or more other devices configured to generate notifications, or a combination thereof, as illustrative examples.

To further illustrate, the plurality of devices 102 may include (or correspond to) devices that are in short-range communication, such as via a Bluetooth (BT) protocol, (Bluetooth is a trademark of Bluetooth Special Interest Group (SIG) of Kirkland, Wash.), a Bluetooth Low Energy (BLE) protocol, a Wi-Fi protocol, (Wi-Fi is a trademark of the Wi-Fi Alliance of Austin, Tex.), a device-to-device (D2D) protocol, or a millimeter-wave (mmWave) protocol, as illustrative examples. Alternatively or in addition, the plurality of devices 102 may include (or correspond to) devices that are in a common geographic region (e.g., a building or a particular region of a building). Although the example of FIG. 1 depicts that the plurality of devices 102 includes two devices, it should be appreciated that in other examples the plurality of devices 102 may include another number of devices (e.g., three or more devices).

The plurality of devices 102 may be associated with a plurality of users. To illustrate, in the example of FIG. 1, the first device 104 is associated with a first user 150, and the second device 106 is associated with a second user 152. In this particular example, a number of devices of the plurality of devices 102 may correspond to a number of users of the plurality of devices 102 (e.g., wherein the plurality of devices 102 includes two devices corresponding to two users). In other examples, the plurality of devices 102 may correspond to a different number of users, such as where a particular user corresponds to multiple devices of the plurality of devices 102.

The second device 106 may correspond to a contact of the first device 104. As used herein, a "contact" of the first device 104 may correspond to a particular device or user that is associated with the first device 104 by information stored at the first device 104, where the information indicates the particular device or user. For example, the first device 104 may store a contact list indicating a phone number of the second device 106, an email address of the second user 152, or a social media username associated with the second user 152. Alternatively or in addition, the first device 104 may be "paired" to the second device 106, such as using a short-range communication protocol.

The system 100 further includes a third device 108. For example, the third device 108 may communicate with one or more of the plurality of devices 102 via a network 148, such as a cellular network, a data network (e.g., the Internet), a wide-area network (WAN), a fiber-optic network, a satellite-based network, another network, or a combination thereof, as illustrative examples.

Each device of the system 100 may include one or more processors configured to execute instructions and one or more memories configured to store instructions. To illustrate, FIG. 1 depicts that the first device 104 includes a processor 132 and a memory 134 configured to store instructions 136. In the example, of FIG. 1, the processor 132 is coupled to the memory 134 and is configured to access the instructions 136. In some examples, the instructions 136 correspond to a program (e.g., an application, or "app") that are executable to perform one or more operations described herein, such as in response to activation (e.g., "launching") of the program by a user (e.g., the first user 150).

The example of FIG. 1 also depicts that the first device 104 includes a timer 140, a delay buffer 144, and one or more sensors 146. In a particular example, the timer 140 is coupled to the delay buffer 144. The processor 132 may be configured to control the one or more sensors 146 and to receive data (e.g., samples) from the one or more sensors 146.

The one or more sensors 146 may include a microphone, an image sensor (e.g., a camera), a proximity detector, or a combination thereof, as illustrative examples. To further illustrate, the one or more sensors 146 may include a proximity sensor configured to detect (or estimate) proximity of an object to the first device 104 using a capacitive sensing technique, a Doppler sensing technique, an inductive sensing technique, an optical sensing technique, a radar sensing technique, an ultrasonic sensing technique, another sensing technique, or a combination thereof.

During operation, the first device 104 may "discover" the second device 106, such as by performing a discovery process to "discover" contacts proximate to the first device 104. In a particular example, the processor 132 is configured to detect the second device 106 using one or more of a short-range communication protocol or location information. To illustrate, the plurality of devices 102 may each execute a program (e.g., instructions included in the instructions 136) that specifies that the plurality of devices 102 are to "search" for one another. In this case, a particular device (e.g., the first device 104 or another device) of the plurality of devices 102 may generate a "beacon" message to enable other devices of the plurality of devices 102 to identify the particular device. In one example, the beacon message is sent using a short-range communication protocol, such as a BT protocol, a BLE protocol, a Wi-Fi protocol, a D2D protocol, or a mmWave protocol, as illustrative examples. Alternatively or in addition, the beacon message (or a response to the beacon message) may include location information associated with the particular device, such as global positioning system (GPS) coordinates.

The first device 104 may detect one or more conditions associated with delaying one or more notifications at the plurality of devices 102. In a particular example, the processor 132 is configured to detect the one or more conditions. Detecting the one or more conditions includes identifying the second device 106 using one or more of a short-range communication protocol, location information, or a contact list stored at the first device. As a non-limiting illustrative example, upon detecting proximity of the second device 106 using a beacon message (or a response to a beacon message), the processor 132 may access a contact list stored at the first device to determine that the second device 106 is a contact of the first device 104. The first device 104 may detect the one or more conditions upon determining that the second device 106 is proximate to the first device 104 and that the second device 106 is a contact of the first device 104. In other examples, the first device 104 may detect the one or more conditions irrespective of whether the second device 106 is a contact of the first device 104, such as in connection with implementations where "non-contacts" that are in short-range communication with (e.g., are "paired with") the first device 104 are to be included in the plurality of devices 102.

Alternatively or in addition, detecting the one or more conditions may include detecting one or more of a conversation of the first user 150 or a social activity of the first user 150. As illustrative examples, the one or more sensors 146 may include a microphone configured to detect whether the user 150 is engaged in a business activity or a social activity, such as by detecting speech from the user 150. In a particular example, the processor 132 is configured to execute the instructions 136 to perform a voice recognition or speech recognition based on the speech.

In response to detecting the one or more conditions, the first device 104 is configured to send a communication 114 to the second device 106. The communication 114 is associated with the timing window 138. During the timing window 138, one or more notifications are to be delayed (e.g., suppressed) at the plurality of devices 102. In some implementations, the communication 114 is sent to the second device 106 to schedule a particular time 116 for generating one or more notifications at the plurality of devices 102.

The processor 132 is configured to execute the instructions 136 to initiate transmission of the communication 114 to the second device 106 (e.g., to schedule the particular time 116). For example, to initiate the transmission, the processor 132 may provide an instruction to a communication device (e.g., a modem) of the first device 104 to cause the communication device to send the communication 114 to the second device 106. In an illustrative example, the instruction specifies one or more of an address (e.g., an Internet Protocol (IP) address, a media access control (MAC) address, or another address) of the second device 106 or a communication protocol with which to send the communication (e.g., a BT protocol, a BLE protocol, a Wi-Fi protocol, a D2D protocol, or a mmWave protocol, or another communication protocol).

Depending on the particular implementation, the particular time 116 may correspond a time of day (e.g., 9:15 PM) or may indicate a "countdown," such as a countdown of 15 minutes. In some implementations, each device of the plurality of devices 102 includes a timer, and the communication 114 causes the plurality of devices 102 to initialize the timer to count to the particular time 116.

The processor 132 may be configured to activate the timer 140, where activation of the timer 140 corresponds to a beginning of the timing window 138. For example, the first device 104 may be configured to set the timer 140 to a zero value corresponding to the beginning of the timing window 138. In a particular example, the timer 140 is configured to count up to (or down from) a particular value 142 that corresponds to expiration of the timing window 138.

The first device 104 is configured to receive a first message 110 from the third device 108 (e.g., during the timing window 138). To further illustrate, the first message 110 may correspond to a phone call, a text message, a voicemail message, an email, a social media message, or another message. The processor 132 is configured to detect the first message 110. For example, the processor 132 may be configured to query a communication device (e.g., a modem) of the first device 104 during the timing window 138 to detect receipt of one or more messages (e.g., to detect receipt of the first message 110) at the first device 104. Alternatively or in addition, the first device 104 may include a communication device (e.g., a modem) configured to notify the processor 132 of receipt of the first message 110 during the timing window 138. In some examples, the first device 104 may be configured to initiate the timing window 138 in response to receiving the first message 110 (e.g., where receiving a message such as the first message 110 corresponds to the one or more conditions described above).

In response to receiving the first message 110 during the timing window 138, the processor 132 is configured to delay (e.g., suppress) a first notification 112 in response to the first message 110 (e.g., until after expiration of the timing window 138). For example, after initiation of the timer 140 and prior to the timer 140 completing counting down to (or up from) the particular value 142, the processor 132 may delay or suppress generating the first notification 112. Alternatively or in addition, the first device 104 may be configured to delay or suppress generating the first notification 112 until the particular time 116.

One or more devices of the plurality of devices 102 may include a memory configured to store notifications that are to be delayed during the timing window 138. To illustrate, the example of FIG. 1 depicts that the delay buffer 144 may be configured to store information associated with one or more notifications (e.g., the first notification 112) during the timing window 138. In a particular example, in response to receiving the first message 110, the processor 132 may be configured to queue a command 154 at the delay buffer 144. The command 154 is associated with the first notification 112, and the delay buffer 144 is configured to store the command 154. In response to determining expiration of the timing window 138, the processor 132 may be configured to retrieve the command 154 from the delay buffer 144 and to execute the command 154 to generate the first notification 112.

To further illustrate, the timer 140 may be configured to provide a notification enable signal 160 to the delay buffer 144 to cause the delay buffer 144 to output information corresponding to the first notification 112. For example, upon counting up to (or down from) the particular value 142, the timer 140 may provide the notification enable signal 160 to the delay buffer 144. In a particular illustrative example, a first value (e.g., a logic zero value) of the notification enable signal 160 inhibits the delay buffer 144 from outputting the command 154, and a second value (e.g., a logic one value) of the notification enable signal 160 causes the delay buffer 144 to output the command 154.

In some cases, the delay buffer 144 more store multiple commands corresponding to multiple notifications, such as where multiple messages are received during the timing window 138. In this case, the delay buffer 144 may be configured to output the multiple commands based on one or more output techniques. In one technique, the delay buffer 144 is configured to output the multiple commands based on a first-in, first-out (FIFO) order (so that notifications are generated in the order in which the corresponding messages are received at the first device 104). Alternatively, the delay buffer 144 may be configured to output the multiple commands based on a last-in, first-out (LIFO) order. In this case, notifications may be generated in the reverse order in which the corresponding messages are received at the first device 104 (e.g., so that a notification corresponding to a more recently received message is generated sooner than a notification corresponding to a less recently received message).

In another example, the delay buffer 144 may be configured to output the multiple commands based on a priority scheme. For example, the processor 132 may assign priorities to notifications based on keywords detected in the messages corresponding to the notifications. In a particular illustrative example, if the processor 132 detects one or more keywords (e.g., "help") in the first message 110, the processor 132 may assign the first notification 112 a higher priority as compared to other notifications. Alternatively or in addition, senders may assign priorities to messages (e.g., where a sender of the first message 110 may "flag" the first message 110 as having a high priority or as having a priority selected from a range of priorities). In a particular example, each notification indicated by the delay buffer 144 includes a priority value generated by the processor 132, and the notification enable signal 160 causes the delay buffer 144 to output the notifications based on the priority values.

Alternatively or in addition, the processor 132 may be configured to bypass use of the delay buffer 144 (and the timing window 138) for one or more messages. In a particular illustrative example, if the processor 132 detects one or more keywords (e.g., "help") in the first message 110, the processor 132 may automatically generate the first notification 112 (without use of the delay buffer 144 and the timing window 138). Alternatively or in addition, senders may assign priorities to messages (e.g., where a sender of the first message 110 may "flag" the first message 110 as having a high priority or as having a priority selected from a range of priorities). In this case, the processor 132 may automatically generate the first notification 112 (without use of the delay buffer 144 and the timing window 138) based on a priority indicated in the first message 110.

In some examples, the first device 104 is configured to "extend" the timing window 138 based on one or more criteria, such as activity detected at (or near) the first device 104. For example, upon detecting that the timer 140 indicates the particular value 142 (or another value), the processor 132 may activate (e.g., power-up) the one or more sensors 146. The one or more sensors 146 may be configured to detect user activity of the first user 150, such as by recording ambient sound at the first device 104 that may indicate speech of the first user 150, as an illustrative example. The processor 132 may be configured to "extend" the timing window 138 in response to the user activity (e.g., to avoid interruption of a conversation that is detected using the one or more sensors 146). Additional illustrative examples of timing window "extension" are described further with reference to FIGS. 2-4.

The processor 132 is configured to generate the first notification 112 at the first device 104 in response to determining expiration of the timing window 138. For example, the first device 104 may be configured to generate the first notification 112 at the particular time 116. As another example, the first device 104 may be configured to generate the first notification 112 in response to detecting that the timer 140 is expired based on the particular value 142. In a particular illustrative example, the first device 104 includes a comparator coupled to the timer 140. The comparator may be configured to compare the particular value 142 to a reference value (e.g., a "stop" value associated with expiration of the timing window 138) to detect expiration of the timing window 138 (e.g., by detecting a "match" between the particular value 142 and the reference value).

Generating the first notification 112 may include generating a sound effect at the first device 104, a graphic (e.g., an icon) at the first device 104, or another notification. As a particular example, generating the first notification 112 may include generating a "missed call" sound effect at the first device 104 and activating a display of the first device 104 to present a graphic. Alternatively or in addition, generating the first notification 112 may include generating a vibration alert at the first device 104 (e.g., by activating a motor of the first device 104 to generate one or more vibration alerts).

Depending on the particular implementation, the processor 132 may be configured to generate the first notification 112 at or after the particular time 116. For example, in some implementations, the first device 104 may generate the first notification 112 at the particular time 116 irrespective of activity of the first user 150. In an alternate implementation, the first device 104 is configured to delay generating the first notification 112 (e.g., until a second particular time) in response to detecting that the first user 150 is engaged in a conversation or a social activity (e.g., based on a time of day, such as a family "meal time").

Sending the communication 114 to the second device 106 may cause the second device 106 to delay (e.g., suppress) generating, until the particular time 116, a second notification 120 indicating receipt of a second message 118 at the second device 106 (e.g., from the third device 108 or another device). The second notification 120 may be different than the first notification 112, such as where the second notification 120 presents different information or has a different format as compared to the first notification 112. The second message 118 may be received from another device of the plurality of devices 102 (e.g., from the first device 104 or from another device that may be included in the plurality of devices 102), from the third device 108 (e.g., via the network 148 or via another network), or from another device.

In some implementations, the particular time 116 may be configurable by a user. For example, the first device 104 may be configured to receive user input (e.g., via an operating system or an application executed by the first device 104) from the first user 150 indicating a delay (or "idle time") between receiving the first message 110 and generating the first notification 112. In some examples, the first device 104 may provide an indication of the particular time 116 to the second device 106 in response to the user input.

In a particular example, the plurality of devices 102 is configured to receive user input selecting a plurality of "idle" times (or delays) for notifications. For example, the first user 150 may provide input to the first device 104 specifying a first preferred duration of the timing window 138, and the second user 152 may provide input to the second device 106 specifying a second preferred duration of the timing window 138. As an example, the devices 104, 106 may prompt the users 150, 152 for the preferred durations (e.g., a preferred "idle time") and may receive indications of the first preferred duration and the second preferred duration in response to the prompt. In a particular example, the first device 104 sends a first indication of the first preferred duration to the second device 106, and the second device 106 sends a second indication of the second preferred duration to the first device 104. The plurality of devices 102 may select a particular duration of the timing window 138 based on one or more criteria. In a particular example, the plurality of devices 102 may select the longest preferred duration as the particular duration.

As an example, the first device 104 may receive user input from the first user 150 indicating a 15 minute idle time, and the second device 106 may receive user input indicating a 10 minute idle time. One or more of the plurality of devices 102 may be configured to select, from among the plurality of idle times selected at the plurality of devices 102, a "maximum" idle time to determine the particular time 116 (e.g., by selecting 15 minutes from among 10 minutes and 15 minutes).

Although certain aspects are described herein with reference to the first device 104 (or the second device 106), it should be appreciated that such aspects may be implemented at the second device 106 (or the first device 104). For example, although the communication 114 is described as being sent by the first device 104 to the second device 106, in other examples, the second device 106 may initiate the timing window 138 by sending the communication 114 to the first device 104 (e.g., in response to detecting one or more conditions indicating that notifications are to be delayed at the plurality of devices 102).

Aspects of the system 100 of FIG. 1 reduce disturbance associated with message notifications. For example, by delaying one or more notifications during the timing window 138, interruption of a conversation between the users 150, 152 may be delayed or avoided.

Figure 2:
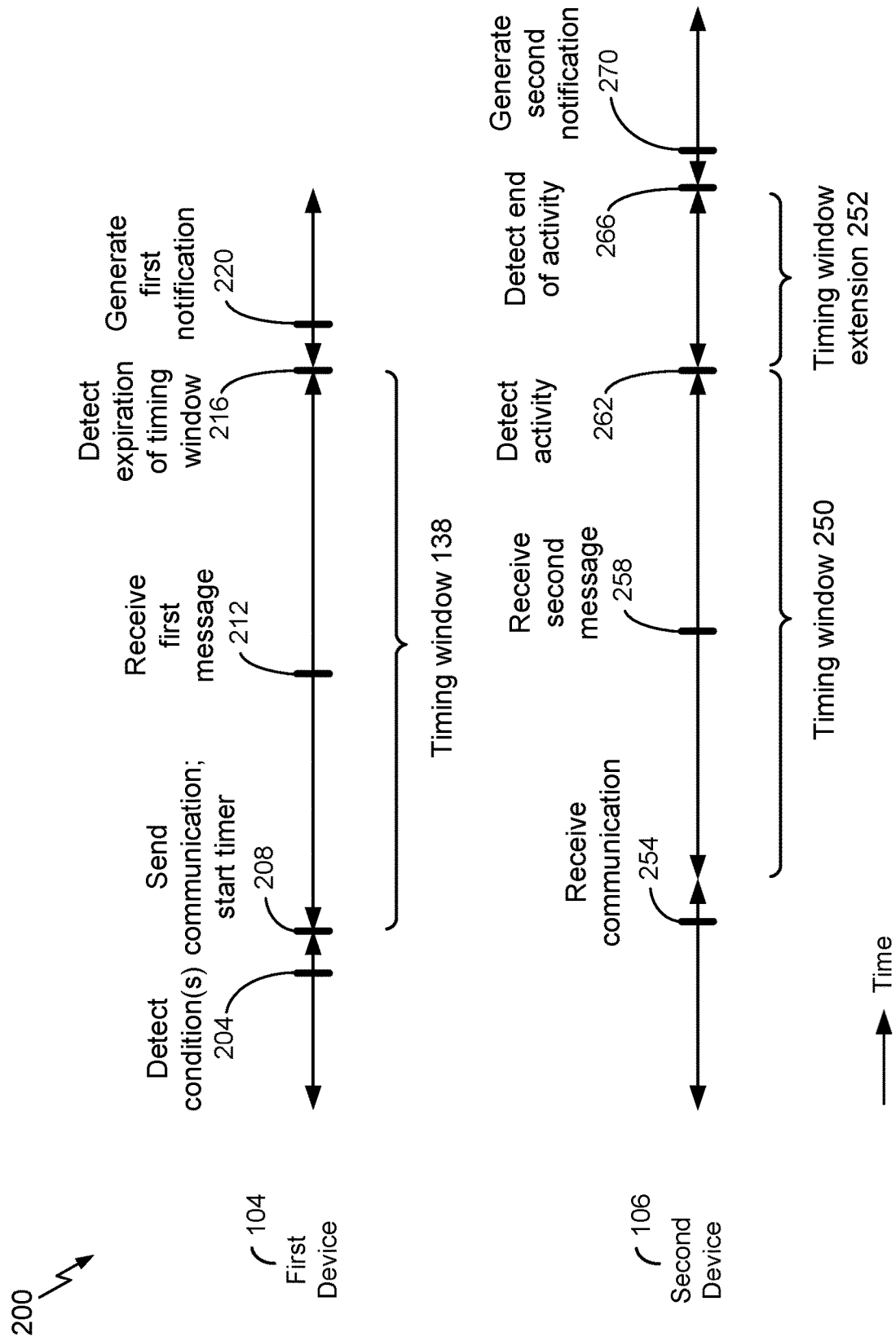
FIG. 2 is timing diagram of certain illustrative operations performed by devices of the system of FIG. 1.

Referring to FIG. 2, a timing diagram is depicted and generally designated 200. The timing diagram 200 describes certain illustrative operations performed by the first device 104 and the second device 106.

In the example of FIG. 2, the first device 104 detects one or more conditions associated with delaying generation of one or more notifications, at 204. For example, detecting the one or more conditions may include identifying the second device 106 using one or more of a short-range communication protocol, location information, or a contact list stored at the first device. Alternatively or in addition, detecting the one or more conditions may include detecting one or more of a conversation of the first user 150 or a social activity of the first user 150.

FIG. 2 also illustrates that in response to detecting the one or more conditions, the first device 104 sends a communication and starts a timer, at 208. For example, the first device 104 may send the communication 114 to the second device 106 and may start the timer 140. Starting the timer 140 corresponds to a beginning of the timing window 138.

The second device 106 may receive the communication, at 254. The second device 106 is configured to initiate a timing window 250 in response to receiving the communication. In some examples, the timing window is as described with reference to the timing window 138. For example, the second device 106 may start a timer to initiate the timing window 250. As another example, one or more of a start time, a duration, or an end time of the timing window 250 may correspond to a start time, a duration, or an end time of the timing window 138. In other examples, the timing window 250 may be different than the timing window 138, such as where the second device 106 determines the timing window 250 independently of determination of the timing window 138 by the first device 104 (e.g., based on different user inputs received at the devices 104, 106). In this case, one or more of a start time, a duration, or an end time of the timing window 250 may be different than a start time, a duration, or an end time of the timing window 138.

The first device 104 may receive one or more messages during the timing window 138 and may suppress one or more notifications associated with the one or more messages until expiration of the timing window 138. For example, in FIG. 2, the first device 104 receives a first message (e.g., the first message 110), at 212. The first device 104 is configured to delay generation of a first notification (e.g., the first notification 112) until expiration of the timing window 138.

The first device 104 is configured to detect expiration of the timing window 138, at 216.

For example, after starting the timer 140 and prior to the timer 140 indicating the particular value 142, the first device 104 may delay or suppress generating the first notification 112. Alternatively or in addition, the first device 104 may be configured to delay or suppress generating the first notification 112 until the particular time 116.

The first device 104 is configured to generate the first notification 112, at 220, in response to determining expiration of the timing window 138. For example, the first device 104 may be configured to generate the first notification 112 at the particular time 116. As another example, the first device 104 may be configured to generate the first notification 112 in response to detecting that the timer 140 indicates the particular value 142.

The second device 106 may receive one or more messages during the timing window 250 and may suppress one or more notifications associated with the one or more messages until expiration of the timing window 250. For example, in FIG. 2, the second device 106 receives a second message (e.g., the second message 118), at 258. The second device 106 is configured to delay generation of a second notification (e.g., the second notification 120) until expiration of the timing window 250.

In the example of FIG. 2, the second device 106 is configured to detect activity, at 262. For example, the second device 106 may include one or more sensors corresponding to the one or more sensors 146 of the first device 104. The second device 106 may be configured to detect speech of the second user 152, such as using a microphone of the second device 106. For example, the second device 106 may detect that the second user 152 is engaged in a business activity or a social activity, such as by detecting speech from the second user 152 and performing a voice recognition or speech recognition based on the speech. In this case, the second device 106 may "extend" the timing window 250, such as based on a timing window extension 252.

During the timing window extension 252, the second device 106 may delay generating the second notification 120. In some implementations, the second device 106 may send a second communication to the first device 104 indicating that the second device 106 is to extend the timing window 250 (e.g., until a second particular time). In some examples, the first device 104 may extend the timing window 138 (e.g., until the second particular time) based on the second communication.

The second device 106 may determine that the activity has ended, at 266. For example, in response to a threshold time interval during which no speech is detected from the second user 152, the second device 106 may determine that the activity has ended. In this case, the second device 106 may determine that the timing window extension 252 is to be terminated and may generate the second notification 120, at 270. Alternatively or in addition, the second device 106 may be configured to terminate the timing window extension 252 in response to user input. As an illustrative example, if the second user 152 provides input to the second device 106 (e.g., by "unlocking" the first device 104, such as using a passcode or other input) during the timing window extension 252, then the second device 106 may terminate the timing window extension 252.

Aspects of the timing diagram 200 of FIG. 2 reduce disturbance associated with message notifications. For example, by delaying one or more notifications during the timing windows 138, 250, interruption of a conversation between the users 150, 152 may be delayed or avoided.

Figure 3:
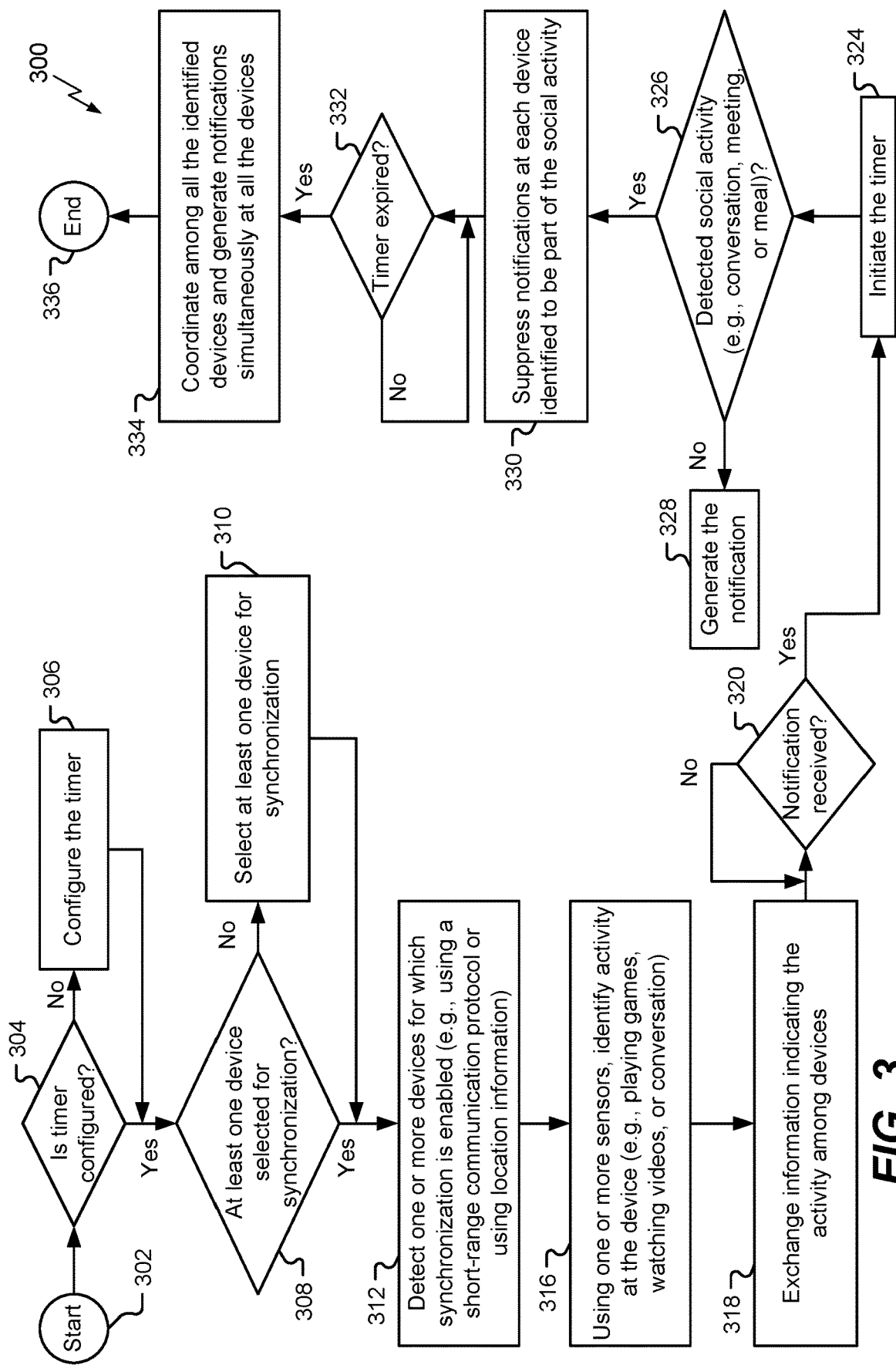
FIG. 3 is a flow diagram of an illustrative example of a method of operation of a device, such a device included in the system of FIG. 1.

Referring to FIG. 3, a particular illustrative example of a method is depicted and generally designated 300. Certain operations of the method 300 are described with reference to the first device 104 of FIG. 1. In other examples, operations of the method 300 are performed by another device of the plurality of devices 102, such as by the second device 106.

The method 300 initiates, at 302. For example, the method 300 may be initiated in response to power-up of the first device 104. To illustrate, upon power-up, the first device 104 may load the instructions 136 from the memory 134 and may execute the instructions 136 to initiate the method 300. In this example, the method 300 is initiated automatically (e.g., based on execution of an operating system of the first device 104). Alternatively or in addition, the method 300 may be initiated manually (e.g., by the first user 150). For example, the first device 104 may load the instructions 136 from the memory 134 and may execute the instructions to initiate the method 300 in response to input from the first user 150 (e.g., via a user interface of the first device 104).

The method 300 further includes determining whether a timer is configured, at 304. For example, the first device 104 may determine whether the particular value 142 of the timer 140 has been determined (e.g., based on input received from the first user 150). If the timer is not configured, the method 300 further includes configuring the timer, at 306 (e.g., by prompting the first user 150 to indicate a preferred "delay" time period, such as the timing window 138, or by prompting the first user 150 to indicate the particular value 142).

If the timer is configured, the method 300 further includes determining whether at least one device is selected for synchronization, at 308. For example, the first device 104 may determine whether the first device 104 stores an indication of at least one device (e.g., the second device 106) with which notifications are to be synchronized. If at least one device is not indicated, the first device 104 may prompt the first user 150 to input information indicating at least one device with which notifications are to be synchronized, at 310. As a particular example, the first device 104 may prompt the first user 150 to identify (e.g., by selecting from a list of contacts stored at the first device 104) one or more devices for which notification synchronization is to be enabled. The first user 150 may input identifiers of the at least one device (e.g., by selecting an icon from a contact list or by entering a phone number or an email address, as illustrative examples). The at least one device may correspond to or may be included in the plurality of devices 102.

If at least one device is selected, the method 300 further includes detecting one or more devices for which synchronization is enabled, at 312. For example, the first device 104 may search for one or more of the plurality of devices 102, such as by transmitting a signal (e.g., a "beacon") to search for one or more of the plurality of devices 102, by "scanning" for signals transmitted by one or more of the plurality of devices 102, or both. As a particular illustrative example, the first device 104 may detect the second device 106 based on selection (e.g., at 308 of the method 300) of the second device 106 by the first user 150.

In one example, detecting the one or more devices is performed using a short-range communication protocol (e.g., a BT protocol, a BLE protocol, a Wi-Fi protocol, a D2D protocol, or a mmWave protocol, or another communication protocol). For example, the first device 104 may identify the one or more devices by determining that the one or more devices are "paired" with the first device 104 via the short-range communication protocol, such as if the first device 104 and the second device 106 are paired via a peer-to-peer link. The method 300 may further include searching for one or more devices of the plurality of devices 102, such as by scanning for beacon signals or by accessing a list of "paired" devices. The method 300 may further include performing a "pairing" process in response to detecting one or more beacon signals.

Alternatively or in addition, location information may be used to detect the one or more devices. For example, a beacon sent (or received) by the first device 104 may indicate a location of the first device 104 (or the second device 106). To further illustrate, the first device 104 may determine GPS coordinates of the first device 104 and may share the GPS coordinates with one or more other devices of the plurality of devices 102.

The method 300 further includes using one or more sensors (e.g., one or more of a microphone, a camera, or a proximity sensor) to identify activity at the device, at 316. For example, the first device 104 may use the one or more sensors 146 to determine that the first user 150 is engaged in an activity, such as a social activity (e.g., engaging in a conversation).

The method 300 further includes exchanging information indicating the activity (or indicating activity detection) among the devices, at 318. For example, in response to detecting activity of the first user 150, the first device 104 may send an indication of the activity to other devices of the plurality of devices 102 (e.g., to the second device 106). As another example, the second device 106 may send an indication of activity of the second user 152 to other devices of the plurality of devices 102 (e.g., to the first device 104).

In some implementations, indications of activity of users of the plurality of devices 102 may be used to dynamically select a duration of the timing window 138. For example, if one or more users are engaged in a social activity (e.g., a conversation), then a duration of the timing window 138 may be greater than if no social activity is detected. As a particular illustrative example, a duration of the timing window 138 may be based on (e.g., may correspond to or may be proportional to) a detected number of users engaged in a conversation or other social activity. In some implementations, if a non-social activity (e.g., playing a game) is detected at a particular device, then the duration of the timing window 138 may be determined independently of the non-social activity (e.g., activity at the particular device may be "excluded" from determination of the duration of the timing window 138). For example, if a user of the particular device is engaged in a non-social activity (e.g., playing a video game at the particular device), then the duration of the timing window 138 may be determined independently of non-social activity at the particular device.

The method 300 further includes detecting a notification, at 320. For example, the first device 104 may determine whether one or more messages (e.g., the first message 110) are received, whether one or more notifications (e.g., the first notification 112) are to be generated, or both. Alternatively or in addition, the first device 104 may access the delay buffer 144 to determine whether one or more notifications are to be generated (e.g., by detecting that the delay buffer 144 stores the command 154 associated with the first notification 112).

In response to detecting the notification, the method 300 further includes initiating the timer, at 324. For example, the first device 104 may start operation of the timer 140 so that the timer 140 counts down from (or up to) the particular value 142.

The method 300 further includes determining whether social activity is detected, at 326.

For example, the first device 104 may detect (e.g., using one or more sensors) whether the first user 150 is engaged in a conversation, a meeting, or a meal. If no activity is detected, the method 300 further includes generating the notification, at 328. For example, the first device 104 may generate the first notification 112 by activating a display of the first device 104, by presenting a graphic or icon at the first device 104, by generating a ringtone or an alert, by performing one or more operations, or a combination thereof.

If social activity is detected, the method 300 further includes suppressing the notifications at each device determined to be part of the social activity, at 330. For example, each device of the plurality of devices 102 may suppress generating any notification scheduled to be generated. As a particular example, the first device 104 may suppress generating the first notification 112.

The method 300 further includes determining whether the timer is expired, at 332. For example, the first device 104 may determine whether the timer 140 indicates the particular value 142. If the timer is expired, the method 300 further includes coordinating among the devices and generating notifications simultaneously at all the devices, at 334. For example, in some cases, the first device 104 may generate the first notification 112 simultaneously with generation of the second notification 120 by the second device 106. Alternatively, in other cases, the first device 104 may generate the first notification 112 at a different time than generation of the second notification 120 by the second device 106, such as described with reference to FIG. 2. The method 300 ends, at 336.

Aspects of the method 300 of FIG. 3 reduce disturbance associated with message notifications. For example, by delaying one or more notifications, interruption of a conversation meeting, or meal engaged in by one or more users may be delayed or avoided.

Figure 4:
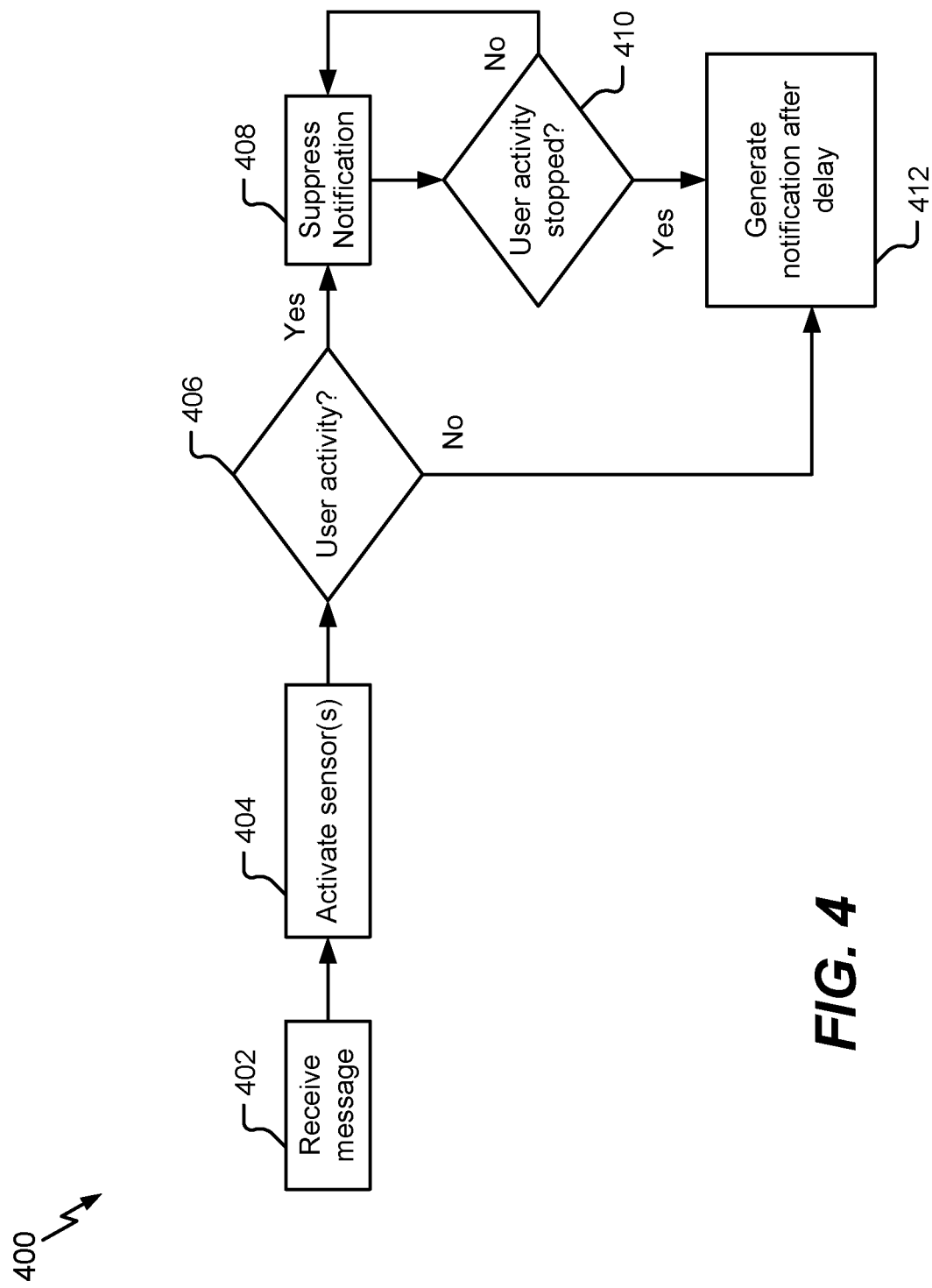
FIG. 4 is a flow diagram of another illustrative example of a method of operation of a device, such a device included in the system of FIG. 1.

Referring to FIG. 4, a particular illustrative example of a method is depicted and generally designated 400. Certain operations of the method 400 are described with reference to the first device 104 of FIG. 1. In other examples, operations of the method 400 are performed by another device of the plurality of devices 102, such as by the second device 106.

The method 400 includes receiving a message, at 402. For example, the first device 104 may receive the first message 110. As another example, the second device 106 may receive the second message 118.

The method 400 further includes activating one or more sensors, at 404. For example, the first device 104 may power-up the one or more sensors 146 (e.g., by transitioning the one or more sensors 146 from operating based on a first amount of power consumption, such as a "sleep" mode, to a second amount of power consumption that is greater than the first amount of power consumption). Alternatively or in addition, the first device 104 may activate the one or more sensors 146 adjusting (e.g., increasing) a duty cycle or a sample rate of the one or more sensors 146.

The method 400 further includes determining whether user activity is occurring, at 406. As a particular illustrative example, the first device 104 may use a microphone of the one or more sensors 146 to record ambient sound at the first device 104. The first device 104 may digitize samples of the ambient sound and may perform a speech recognition operation or a voice recognition operation to detect whether the first user 150 (or another user) is engaged in conversation. Alternatively or in addition, the first device 104 may compare amplitude of the digitized samples to determine whether user activity is occurring.

If user activity is occurring, the method 400 further includes suppressing a notification corresponding to the message, at 408. For example, the first device 104 may store (e.g., queue) the first notification 112 at the delay buffer 144.

In response to detecting that the user activity has stopped, at 410 (or if no activity is detected, at 406), the method 400 further includes generating the notification after a delay, at 412. In a particular illustrative example, the delay corresponds to the timing window extension 252 (where the delay has a duration corresponding to a duration of the timing window extension 252).

The method 400 of FIG. 4 may reduce interruption associated with notifications at a device. For example, by delaying notification generation until after user activity has ceased, interruption associated with notifications may be reduced.

Figure 5:
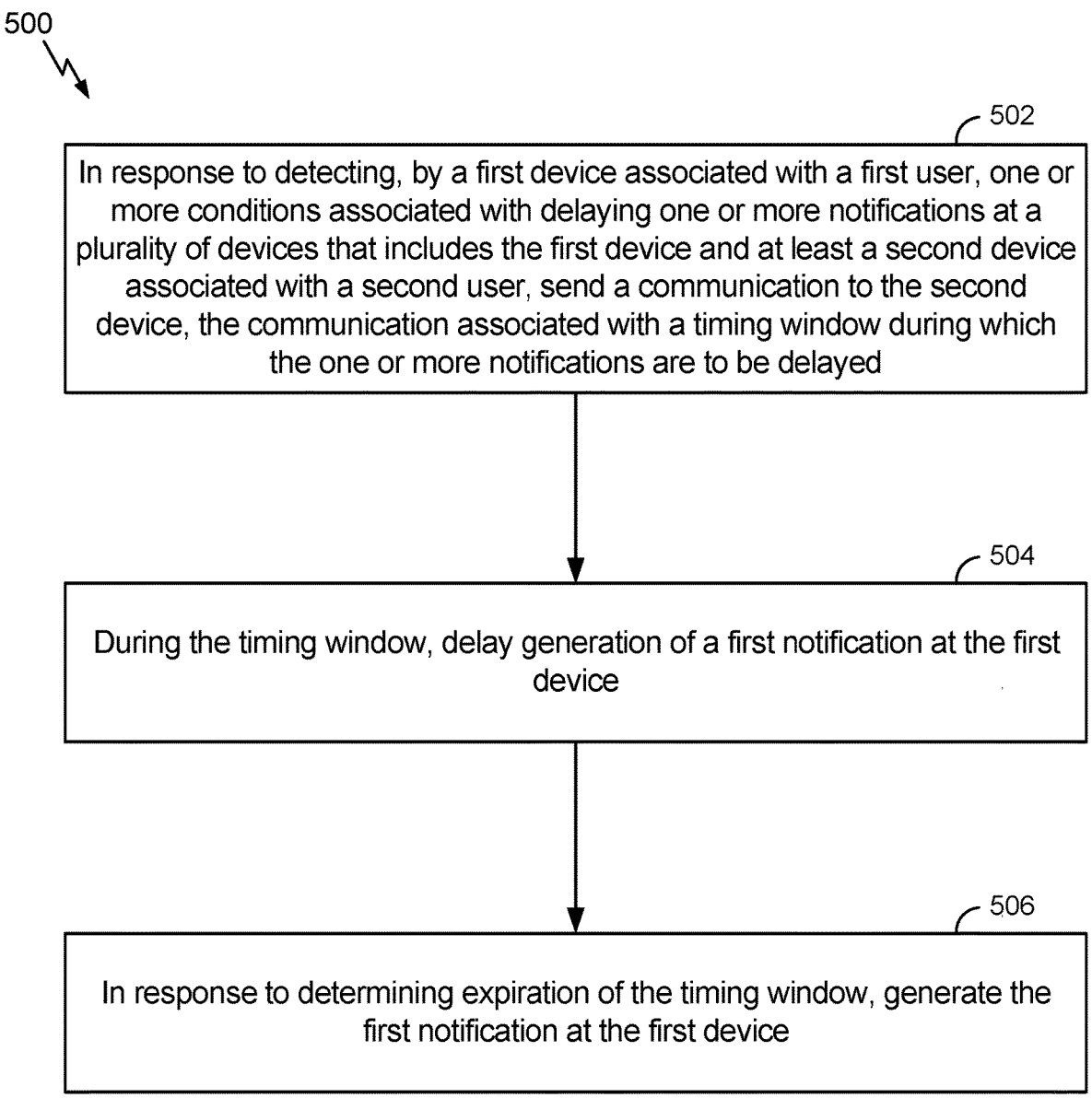
FIG. 5 is a flow diagram of another illustrative example of a method of operation of a device, such a device included in the system of FIG. 1.

Referring to FIG. 5, a particular illustrative example of a method is depicted and generally designated 500. Certain operations of the method 500 are described with reference to the first device 104 of FIG. 1. In other examples, operations of the method 500 are performed by another device of the plurality of devices 102, such as by the second device 106.

The method 500 includes sending a communication to a second device, at 502. The communication is sent by a first device (e.g., the first device 104) associated with a first user (e.g., the first user 150), and the second device (e.g., the second device 106) is associated with a second user (e.g., the second user 152). The communication is associated with a timing window (e.g., the timing window 138) during which the one or more notifications are to be delayed. In a particular example, communicating with the second device includes sending or receiving a communication (e.g., the communication 114) indicating a particular time (e.g., the particular time 116) at which a first notification (e.g., the first notification 112) is scheduled to be generated, and the timing window expires at the particular time.

The first device sends the communication to the second device in response to detecting one or more conditions associated with delaying one or more notifications at a plurality of devices that includes the first device and at least the second device. For example, detecting the one or more conditions may include identifying the second device using one or more of a short-range communication protocol, location information, or a contact list stored at the first device. Alternatively or in addition, detecting the one or more conditions may include detecting at the first device one or more of a conversation of the first user or a social activity of the first user.

The method 500 further includes delaying, during the timing window, generation of a first notification at the first device, at 504. For example, the first device 104 may delay generation of the first notification 112 during the timing window 138, such as by storing the command 154 at the delay buffer 144 during the timing window 138.

The method 500 further includes generating, in response to determining expiration of the timing window, the first notification at the first device, at 506. In one example, the timing window expires based on a timer (e.g., the timer 140). To illustrate, the method 500 may include activating the timer at the first device to determine a beginning of the timing window and determining the expiration of the timing window upon detecting that the timer indicates a particular value (e.g., the particular value 142).

In some examples, the timing window may be "extended," such as described with reference to the timing window extension 252 of FIG. 2. To further illustrate, the method 500 may further include extending the timing window in response to detecting one or more of a conversation of the first user or a social activity of the first user. In this case, the method 500 may further include terminating the timing window extension in response to detecting termination of the conversation or the social activity or in response to user input at the first device. As an illustrative example, if the second user 152 provides input to the second device 106 (e.g., by "unlocking" the second device 106, such as using a passcode or other input) during the timing window extension 252, then the second device 106 may terminate the timing window extension 252.

In a particular example, the first notification is generated in response to a first message (e.g., the first message 110) received at the first device. For example, the method 500 may further include receiving the first message at the first device prior to the expiration of the timing window, where the first message is associated with the first notification. To further illustrate, the first message may correspond to a phone call, a text message, a voicemail message, an email, an application alert, or another message, as illustrative examples.

The method 500 may further include receiving user input at the first device indicating a duration of the timing window. For example, the first user 150 may provide input to the first device 104 specifying a preferred duration of the timing window 138. The method 500 further includes providing an indication of the duration of the timing window to the second device 106. As an example, the devices 104, 106 may prompt the users 150, 152 for preferred durations of the timing window 138 (e.g., a preferred "idle time") and may receive user input indicating the preferred durations from the users 150, 152. The devices 104, 106 may communicate the preferred durations to each other and may select a particular duration based on one or more criteria (e.g., by selecting the longest preferred duration as the particular duration).

The method 500 may reduce distraction associated with notifications. For example, communicating with the second device may cause the second device to delay generation of a second notification (e.g., the second notification 120) at the second device, reducing distraction associated with notifications.

Figure 6:
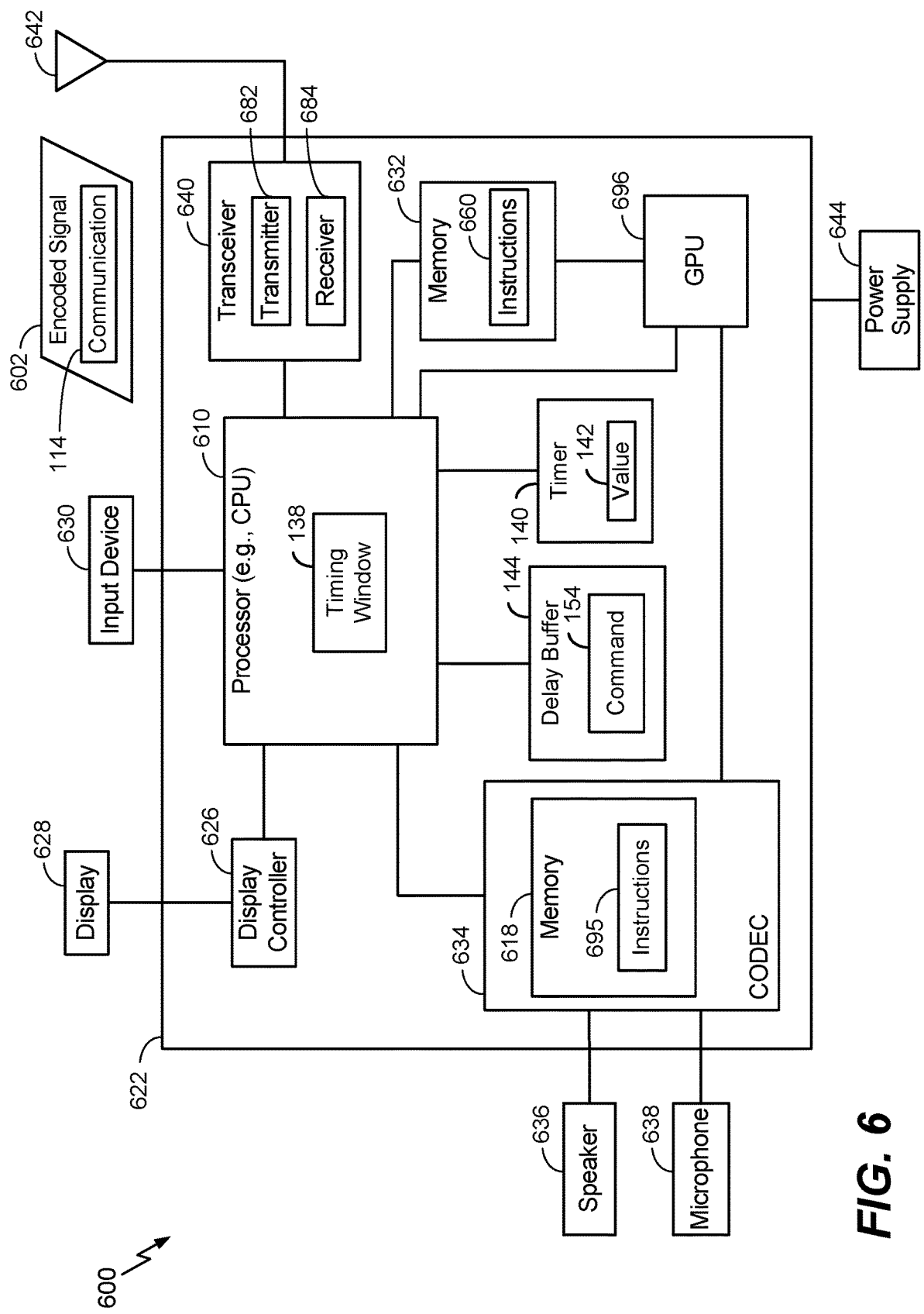
FIG. 6 is a block diagram of an illustrative example of an electronic device, such as an electronic device included in the system of FIG. 1.

Referring to FIG. 6, a block diagram of a particular illustrative example of an electronic device is depicted and generally designated 600. The electronic device 600 may be included in the plurality of devices 102 of FIG. 1. In a particular example, the electronic device 600 corresponds to the first device 104. Alternatively or in addition, one or more aspects of the electronic device 600 may correspond to the second device 106. In the example of FIG. 6, the electronic device 600 includes the timer 140 and the delay buffer 144.

In an illustrative example, the electronic device 600 corresponds to a mobile device (e.g., a cellular phone). Alternatively or in addition, one or more aspects of the electronic device 600 may be implemented within a computer (e.g., a server, a laptop computer, a tablet computer, or a desktop computer), an access point, a base station, a wearable electronic device (e.g., a personal camera, a head-mounted display, or a watch), a vehicle control system or console, an autonomous vehicle (e.g., a robotic car or a drone), a home appliance, a set top box, an entertainment device, a navigation device, a personal digital assistant (PDA), a television, a monitor, a tuner, a radio (e.g., a satellite radio), a music player (e.g., a digital music player or a portable music player), a video player (e.g., a digital video player, such as a digital video disc (DVD) player or a portable digital video player), a robot, a healthcare device, a virtual reality (VR) device, an augmented reality (AR) device, another electronic device, or a combination thereof.

The electronic device 600 includes one or more processors, such as a processor 610 (e.g., the processor 132 of FIG. 1) and a graphics processing unit (GPU) 696. The processor 610 may include a central processing unit (CPU), a digital signal processor (DSP), another processing device, or a combination thereof.

The electronic device 600 may further include one or more memories, such as a memory 632 (e.g., the memory 134 of FIG. 1). The memory 632 may be coupled to the processor 610, to the GPU 696, or to both. The memory 632 may include random access memory (RAM), magnetoresistive random access memory (MRAM), flash memory, read-only memory (ROM), programmable read-only memory (PROM), erasable programmable read-only memory (EPROM), electrically erasable programmable read-only memory (EEPROM), one or more registers, a hard disk, a removable disk, a compact disc read-only memory (CD-ROM), another memory device, or a combination thereof.

The memory 632 may store instructions 660 (e.g., the instructions 136 of FIG. 1). The instructions 660 may be executable by the processor 610, by the GPU 696, or by both. The instructions 660 may be executable to perform, initiate, or control one or more operations described herein, such as one or more operations described with reference to the methods 300, 400, and 500 of FIGS. 3-5.

A CODEC 634 can also be coupled to the processor 610. The CODEC 634 may be coupled to one or more microphones, such as a microphone 638 (e.g., a microphone included in the one or more sensors 146 of FIG. 1). The CODEC 634 may include a memory 618. The memory 618 may store instructions 695 executable by the CODEC 634.

FIG. 6 also shows a display controller 626 that is coupled to the processor 610 and to a display 628. A speaker 636 may be coupled to the CODEC 634.

The electronic device 600 may further include a transmitter 682 coupled to an antenna 642. The transmitter 682 may be configured to transmit an encoded signal 602 (e.g., to the second device 106). In a particular example, the encoded signal 602 includes or corresponds to the communication 114 of FIG. 1. Alternatively or in addition, the electronic device 600 may include a receiver 684 configured to receive the encoded signal 602 (e.g., from the second device 106). The receiver 684 may be coupled to the antenna 642, to one or more other antennas, or a combination thereof. In the example of FIG. 6, the transmitter 682 and the receiver 684 are included in a transceiver 640.

The electronic device 600 further includes the timer 140 and the delay buffer 144. In FIG. 6, the timer 140 and the delay buffer 144 are coupled to the processor 610. In other examples, one or both of the timer 140 and the delay buffer 144 may be integrated within the processor 610.

Upon expiration of the timing window 138 of FIG. 1 (e.g., based on the timer 140 indicating the particular value 142), the processor 610 may receive the command 154 from the delay buffer 144. The processor 610 may execute the command 154 to generate the first notification 112 of FIG. 1. Generating the first notification 112 may include generating a sound using the speaker 636, displaying a graphic using the display 628, generating a vibration alert, performing one or more other operations, or a combination thereof.

In a particular example, the timer 140, the delay buffer 144, the processor 610, the GPU 696, the memory 632, the display controller 626, the CODEC 634, and the transceiver 640 are included in a system-on-chip (SoC) device 622. Further, an input device 630 and a power supply 644 may be coupled to the SoC device 622. Moreover, in a particular example, as illustrated in FIG. 6, the display 628, the input device 630, the speaker 636, the microphone 638, the antenna 642, and the power supply 644 are external to the SoC device 622. However, each of the display 628, the input device 630, the speaker 636, the microphone 638, the antenna 642, and the power supply 644 can be coupled to a component of the SoC device 622, such as to an interface or to a controller.

Figure 7:
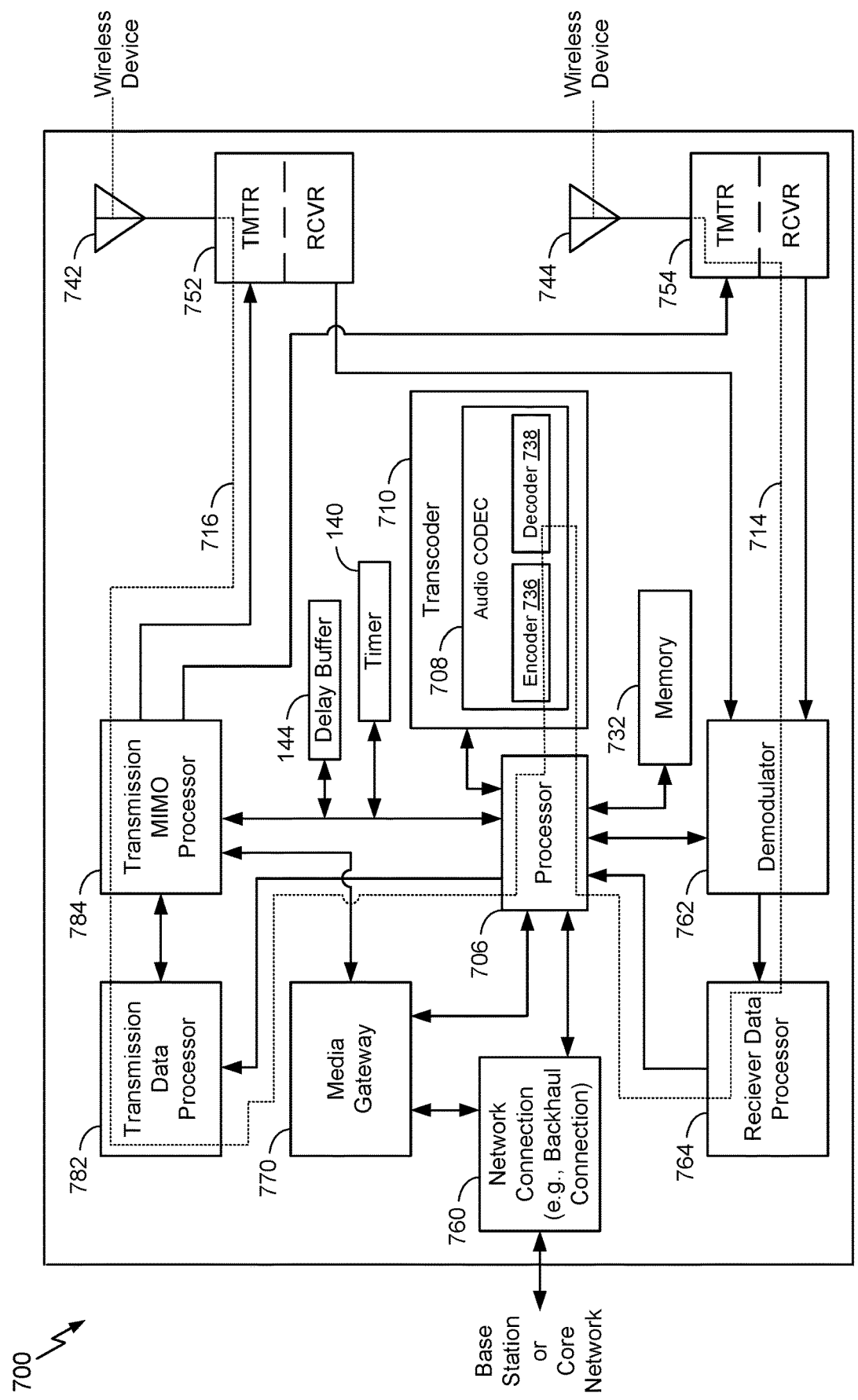
FIG. 7 is a block diagram of an illustrative example of a base station that may be included in the system of FIG. 1.

Referring to FIG. 7, a block diagram of a particular illustrative example of a base station 700 is depicted. In various implementations, the base station 700 may have more components or fewer components than illustrated in FIG. 7.

In some implementations, the base station 700 may communicate with one or more devices of the plurality of devices 102 of FIG. 1. As an example, the base station 700 may correspond to the third device 108. As another example, the base station 700 may be associated with or included in the network 148. As a particular example, the network 148 may include a cellular network controlled or accessed by the base station 700. The base station 700 may be configured to receive the first message 110 from the third device 108 and to send the first message 110 to the first device 104, as an illustrative example.

In the example of FIG. 7, the base station 700 is configured to perform one or more operations to delay a notification at a device (e.g., a device of the plurality of devices 102). For example, FIG. 7 depicts that the base station 700 may include a timer (e.g., the timer 140) and a delay buffer (e.g., the delay buffer 144). In this example, the base station 700 may be configured to delay sending the first message 110 to the first device 104, such as by storing the first message 110 at the delay buffer 144 until expiration of a timing window (e.g., the timing window 138) based on the timer 140.

The base station 700 may be part of a wireless communication system. The wireless communication system may include multiple base stations and multiple wireless devices. The wireless communication system may be a Long Term Evolution (LTE) system, a Code Division Multiple Access (CDMA) system, a Global System for Mobile Communications (GSM) system, a wireless local area network (WLAN) system, or some other wireless system. A CDMA system may implement Wideband CDMA (WCDMA), CDMA 1×, Evolution-Data Optimized (EVDO), Time Division Synchronous CDMA (TD-SCDMA), or some other version of CDMA.

The wireless devices may also be referred to as user equipment (UE), a mobile station, a terminal, an access terminal, a subscriber unit, a station, etc. The wireless devices may include a cellular phone, a smartphone, a tablet, a wireless modem, a personal digital assistant (PDA), a handheld device, a laptop computer, a smartbook, a netbook, a tablet, a cordless phone, a wireless local loop (WLL) station, a Bluetooth device, etc. The wireless devices may include or correspond to devices of the plurality of devices 102 of FIG. 1.

Various functions may be performed by one or more components of the base station 700 (and/or in other components not shown), such as sending and receiving messages and data (e.g., audio data). In a particular example, the base station 700 includes a processor 706 (e.g., a CPU). The base station 700 may include a transcoder 710. The transcoder 710 may include an audio CODEC 708. For example, the transcoder 710 may include one or more components (e.g., circuitry) configured to perform operations of the audio CODEC 708. As another example, the transcoder 710 may be configured to execute one or more computer-readable instructions to perform the operations of the audio CODEC 708. Although the audio CODEC 708 is illustrated as a component of the transcoder 710, in other examples one or more components of the audio CODEC 708 may be included in the processor 706, another processing component, or a combination thereof. For example, a decoder 738 (e.g., a vocoder decoder) may be included in a receiver data processor 764. As another example, an encoder 736 (e.g., a vocoder encoder) may be included in a transmission data processor 782.

The transcoder 710 may be configured to transcode messages and data between two or more networks. The transcoder 710 may be configured to convert message and audio data from a first format (e.g., a digital format) to a second format. To illustrate, the decoder 738 may decode encoded signals having a first format and the encoder 736 may encode the decoded signals into encoded signals having a second format. Additionally or alternatively, the transcoder 710 may be configured to perform data rate adaptation. For example, the transcoder 710 may downconvert a data rate or upconvert the data rate without changing a format of the audio data. To illustrate, the transcoder 710 may downconvert 64 kilobits per second (kbps) signals into 16 kbps signals.

The audio CODEC 708 may include the encoder 736 and the decoder 738. The encoder 736 may include an encoder selector, a speech encoder, and a non-speech encoder. The decoder 738 may include a decoder selector, a speech decoder, and a non-speech decoder.

The base station 700 may include a memory 732. The memory 732, such as a computer-readable storage device, may include instructions. The instructions may include one or more instructions that are executable by the processor 706, the transcoder 710, or a combination thereof, to perform one or more operations of the methods 300, 400, and 500 of FIGS. 3-5. The base station 700 may include multiple transmitters and receivers (e.g., transceivers), such as a first transceiver 752 and a second transceiver 754, coupled to an array of antennas. The array of antennas may include a first antenna 742 and a second antenna 744. The array of antennas may be configured to wirelessly communicate with one or more wireless devices, such as the electronic device 300 of FIG. 3. For example, the second antenna 744 may receive a data stream 714 (e.g., a bit stream) from a wireless device. The data stream 714 may include messages, data (e.g., encoded speech data), or a combination thereof.

The base station 700 may include a network connection 760, such as backhaul connection. The network connection 760 may be configured to communicate with a core network or one or more base stations of the wireless communication network. For example, the base station 700 may receive a second data stream (e.g., messages or audio data) from a core network via the network connection 760. The base station 700 may process the second data stream to generate messages or audio data and provide the messages or the audio data to one or more wireless device via one or more antennas of the array of antennas or to another base station via the network connection 760. In a particular implementation, the network connection 760 may be a wide area network (WAN) connection, as an illustrative, non-limiting example. In some implementations, the core network may include or correspond to a Public Switched Telephone Network (PSTN), a packet backbone network, or both.

The base station 700 may include a media gateway 770 that is coupled to the network connection 760 and the processor 706. The media gateway 770 may be configured to convert between media streams of different telecommunications technologies. For example, the media gateway 770 may convert between different transmission protocols, different coding schemes, or both. To illustrate, the media gateway 770 may convert from PCM signals to Real-Time Transport Protocol (RTP) signals, as an illustrative, non-limiting example. The media gateway 770 may convert data between packet switched networks (e.g., a Voice Over Internet Protocol (VoIP) network, an IP Multimedia Subsystem (IMS), a fourth generation (4G) wireless network, such as LTE, WiMax, and UMB, etc.), circuit switched networks (e.g., a PSTN), and hybrid networks (e.g., a second generation (2G) wireless network, such as GSM, GPRS, and EDGE, a third generation (3G) wireless network, such as WCDMA, EV-DO, and HSPA, etc.).

Additionally, the media gateway 770 may include a transcoder, such as the transcoder 710, and may be configured to transcode data when codecs are incompatible. For example, the media gateway 770 may transcode between an Adaptive Multi-Rate (AMR) codec and a G.711 codec, as an illustrative, non-limiting example. The media gateway 770 may include a router and a plurality of physical interfaces. In some implementations, the media gateway 770 may also include a controller (not shown). In a particular implementation, the media gateway controller may be external to the media gateway 770 or to the base station 700. The media gateway controller may control and coordinate operations of multiple media gateways. The media gateway 770 may receive control signals from the media gateway controller and may function to bridge between different transmission technologies and may add service to end-user capabilities and connections.

The base station 700 may include a demodulator 762 that is coupled to the transceivers 752, 754, the receiver data processor 764, and the processor 706. The receiver data processor 764 may be coupled to the processor 706. The demodulator 762 may be configured to demodulate modulated signals received from the transceivers 752, 754 and to provide demodulated data to the receiver data processor 764. The receiver data processor 764 may be configured to extract a message or audio data from the demodulated data and send the message or the audio data to the processor 706.

The base station 700 may include a transmission data processor 782 and a transmission multiple input-multiple output (MIMO) processor 784. The transmission data processor 782 may be coupled to the processor 706 and the transmission MIMO processor 784. The transmission MIMO processor 784 may be coupled to the transceivers 752, 754 and the processor 706. In some implementations, the transmission MIMO processor 784 may be coupled to the media gateway 770. The transmission data processor 782 may be configured to receive the messages or the audio data from the processor 706 and to code the messages or the audio data based on a coding scheme, such as CDMA or orthogonal frequency-division multiplexing (OFDM), as an illustrative, non-limiting examples. The transmission data processor 782 may provide the coded data to the transmission MIMO processor 784.

The coded data may be multiplexed with other data, such as pilot data, using CDMA or OFDM techniques to generate multiplexed data. The multiplexed data may then be modulated (i.e., symbol mapped) by the transmission data processor 782 based on a particular modulation scheme (e.g., binary phase-shift keying (BPSK), quadrature phase-shift keying (QSPK), M-ary phase-shift keying (M-PSK), M-ary quadrature amplitude modulation (M-QAM), etc.) to generate modulation symbols. In a particular implementation, the coded data and other data may be modulated using different modulation schemes. The data rate, coding, and modulation for each data stream may be determined by instructions executed by processor 706.

The transmission MIMO processor 784 may be configured to receive the modulation symbols from the transmission data processor 782 and may further process the modulation symbols and may perform beamforming on the data. For example, the transmission MIMO processor 784 may apply beamforming weights to the modulation symbols. The beamforming weights may correspond to one or more antennas of the array of antennas from which the modulation symbols are transmitted.

During operation, the second antenna 744 of the base station 700 may receive a data stream 714. The second transceiver 754 may receive the data stream 714 from the second antenna 744 and may provide the data stream 714 to the demodulator 762. The demodulator 762 may demodulate modulated signals of the data stream 714 and provide demodulated data to the receiver data processor 764. The receiver data processor 764 may extract audio data from the demodulated data and provide the extracted audio data to the processor 706.

The processor 706 may provide the audio data to the transcoder 710 for transcoding. The decoder 738 of the transcoder 710 may decode the audio data from a first format into decoded audio data and the encoder 736 may encode the decoded audio data into a second format. In some implementations, the encoder 736 may encode the audio data using a higher data rate (e.g., upconvert) or a lower data rate (e.g., downconvert) than received from the wireless device. In other implementations the audio data may not be transcoded. Although transcoding (e.g., decoding and encoding) is illustrated as being performed by a transcoder 710, the transcoding operations (e.g., decoding and encoding) may be performed by multiple components of the base station 700. For example, decoding may be performed by the receiver data processor 764 and encoding may be performed by the transmission data processor 782. In other implementations, the processor 706 may provide the audio data to the media gateway 770 for conversion to another transmission protocol, coding scheme, or both. The media gateway 770 may provide the converted data to another base station or core network via the network connection 760.

The decoder 738 and the encoder 736 may select a corresponding decoder (e.g., a speech decoder or a non-speech decoder) and a corresponding encoder to transcode (e.g., decode and encode) the frame. The decoder 738 and the encoder 736 may determine, on a frame-by-frame basis, whether each received frame of the data stream 714 corresponds to a narrowband frame or a wideband frame and may select a corresponding decoding output mode (e.g., a narrowband output mode or a wideband output mode) and a corresponding encoding output mode to transcode (e.g., decode and encode) the frame. Encoded audio data generated at the encoder 736, such as transcoded data, may be provided to the transmission data processor 782 or the network connection 760 via the processor 706.

The transcoded audio data from the transcoder 710 may be provided to the transmission data processor 782 for coding according to a modulation scheme, such as OFDM, to generate the modulation symbols. The transmission data processor 782 may provide the modulation symbols to the transmission MIMO processor 784 for further processing and beamforming. The transmission MIMO processor 784 may apply beamforming weights and may provide the modulation symbols to one or more antennas of the array of antennas, such as the first antenna 742 via the first transceiver 752. Thus, the base station 700 may provide a transcoded data stream 716, that corresponds to the data stream 714 received from the wireless device, to another wireless device. The transcoded data stream 716 may have a different encoding format, data rate, or both, than the data stream 714. In other implementations, the transcoded data stream 716 may be provided to the network connection 760 for transmission to another base station or a core network.

In conjunction with the described embodiments, a computer-readable medium (e.g., any of the memory 134, the memory 618, the memory 632, or the memory 732) stores instructions (e.g., any of the instructions 136, the instructions 660, or the instructions 695) executable by a processor (e.g., the processor 132, the processor 610, the GPU 696, or the processor 706) to cause the processor to initiate, perform, or control operations. The operations include sending a communication in response to detecting, by a first device (e.g., the first device 104) associated with a first user (e.g., the first user 150), one or more conditions associated with delaying one or more notifications (e.g., any of the notifications 112, 120) at a plurality of devices (e.g., the plurality of devices 102) that includes the first device and at least a second device (e.g., the second device 106) associated with a second user (e.g., the second user 152). The communication is sent to the second device and is associated with a timing window (e.g., the timing window 138) during which the one or more notifications are to be delayed. The operations further include delaying, during the timing window, generation of a first notification (e.g., the first notification 112) at the first device. The operations further include generating, in response to determining expiration of the timing window, the first notification at the first device.

In conjunction with the described embodiments, an apparatus includes means (e.g., any of the memories 134, 618, 632, and 732) for storing instructions (e.g., any of the instructions 136, the instructions 660, or the instructions 695) at a first device (e.g., the first device 104) associated with a first user (e.g., the first user 150). The apparatus further includes means (e.g., the processor 132, the processor 610, the GPU 696, or the processor 706) for executing the instructions at the first device to initiate a transmission to a second device (e.g., the second device 106) associated with a second user (e.g., the second user 152), for delaying, during a timing window (e.g., the timing window 138), generation of a first notification (e.g., the first notification 112) at the first device, and for generating, in response to determining expiration of the timing window, the first notification at the first device. The transmission is initiated in response to detecting one or more conditions associated with delaying one or more notifications at a plurality of devices (e.g., the plurality of devices 102) that includes the first device and the second device. The transmission is to send a communication (e.g., the communication 114) to the second device. The communication is associated with a timing window (e.g., the timing window 138) during which the one or more notifications (e.g., any of the notifications 112, 120) are to be delayed. In a particular example, the first device corresponds to a mobile device.

As used herein, "coupled" may include communicatively coupled, electrically coupled, magnetically coupled, physically coupled, optically coupled, and combinations thereof. Two devices (or components) may be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled may be included in the same device or in different devices and may be connected via electronics, one or more connectors, or inductive coupling, as illustrative, non-limiting examples. In some implementations, two devices (or components) that are communicatively coupled, such as in electrical communication, may send and receive electrical signals (digital signals or analog signals) directly or indirectly, such as via one or more wires, buses, networks, etc.

As used herein, "generating," "calculating," "using," "selecting," "accessing," and "determining" may be used interchangeably. For example, "generating," "calculating," or "determining" a value, a characteristic, a parameter, or a signal may refer to actively generating, calculating, or determining a value, a characteristic, a parameter, or a signal or may refer to using, selecting, or accessing a value, a characteristic, a parameter, or a signal that is already generated, such as by a component or a device.

The foregoing disclosed devices and functionalities may be designed and represented using computer files (e.g. RTL, GDSII, GERBER, etc.). The computer files may be stored on computer-readable media. Some or all such files may be provided to fabrication handlers who fabricate devices based on such files. Resulting products include wafers that are then cut into die and packaged into integrated circuits (or "chips"). The integrated circuits are then employed in electronic devices, such as the first device 104 of FIG. 1, the second device 106 of FIG. 1, the third device 108 of FIG. 1, the electronic device 600 of FIG. 6, or the base station 700 of FIG. 7.

Although certain examples have been described separately for convenience, it is noted that aspects of such examples may be suitably combined without departing from the scope of the disclosure. For example, although aspects of the first device 104 and the second device 106 have been described separately for convenience, such as aspects may be implemented at a single device (e.g., the first device 104, the second device 106, or another device). Those of skill in the art will recognize other such modifications that are within the scope of the disclosure.

The various illustrative logical blocks, configurations, modules, circuits, and algorithm steps described in connection with the examples disclosed herein may be implemented as electronic hardware, computer software executed by a processor, or combinations of both. Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, but such implementation decisions should not be interpreted as causing a departure from the scope of the present disclosure.

One or more operations of a method or algorithm described herein may be embodied directly in hardware, in a software module executed by a processor, or in a combination of the two. For example, one or more operations of the methods 300, 400, and 500 of FIGS. 3-5 may be initiated, controlled, or performed by a field-programmable gate array (FPGA) device, an application-specific integrated circuit (ASIC), a processing unit such as a central processing unit (CPU), a digital signal processor (DSP), a controller, another hardware device, a firmware device, or a combination thereof. A software module may reside in random access memory (RAM), magnetoresistive random access memory (MRAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transitory storage medium known in the art. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed examples is provided to enable a person skilled in the art to make or use the disclosed examples. Various modifications to these examples will readily apparent to those skilled in the art, and the principles defined herein may be applied to other examples without departing from the scope of the disclosure. Thus, the present disclosure is not intended to be limited to the examples shown herein but is to be accorded the widest scope possible consistent with the principles and novel features as defined by the following claims.

What is claimed is:

1. A method of operation of a first device of a plurality of devices, the method comprising:
   detecting, by the first device, one or more conditions based at least in part on a sensor of the first device;
   determining, based on the detecting, that one or more notifications are to be delayed at the plurality of devices;
   in response to the determining, sending a communication to a second device of the plurality of devices, the communication indicating a timing window during which notifications are to be delayed;
   after sending the communication, receiving a first message at the first device;
   responsive to receiving the first message and an end of the timing window, coordinating with the second device to determine a time to generate a first notification of the first message at the first device; and
   generating the first notification of the first message at the first device at the determined time.

2. The method of claim 1, wherein generation of the first notification of the first message is timed to be simultaneous with one or more notification generated by one or more of the plurality of devices.

3. The method of claim 1, further comprising receiving a second communication from the second device, the second communication proposing a second timing window during which the one or more notifications are to be delayed, and selecting to use the timing window rather than the second timing window based on a selection criteria.

4. The method of claim 1, wherein detecting the one or more conditions includes detecting at the first device one or more of a conversation of a first user or a social activity of the first user.

5. The method of claim 1, wherein sending the communication causes the second device to delay generation of a second notification at the second device, the second notification different than the first notification.

6. The method of claim 1, further comprising:
   receiving a second message at the first device prior to the end of the timing window;
   delaying generation of a second notification of the second message; and
   based on detecting expiration of the timing window, generating the second notification of the second message, wherein an output order of the first notification and the second notification is based in part on an order of receipt of the first message and the second message.

7. The method of claim 6, wherein the output order is a last in first out order.

8. The method of claim 1, further comprising:
   activating a timer at the first device to determine a beginning of the timing window; and
   determining the end of the timing window upon detecting that the timer indicates a particular value.

9. The method of claim 1, further comprising:
   prior to expiration of the timing window, detecting an extension condition;
   based on detecting the extension condition, extending the timing window; and
   prior to expiration of the extended timing window, detecting termination of the extension condition; and
   determining an end of the timing window based on termination of the extension condition.

10. The method of claim 1, wherein a duration of the timing window is based a condition detected by the second device.

11. An apparatus comprising:
    a memory configured to store instructions; and
    a processor configured to execute the instructions to initiate a transmission of a communication to a second device in response to determining, based on the one or more conditions detected at a first device, to delay one or more notifications at a plurality of devices the communication indicating a timing window during which notifications are to be delayed, wherein the processor is further configured to, after receiving a first message after transmission of the communication and after an end of the timing window, coordinate with the second device to determine a time to generate a first notification of the first message at the first device and, in response to detecting expiration of the timing window, generate the first notification of the first message at the first device at the determined time.

12. The apparatus of claim 11, further comprising a delay buffer configured to store a command associated with generation of the first notification.

13. The apparatus of claim 12, wherein the processor is further configured to, in response to detecting the end of the timing window, retrieve the command from the delay buffer and to execute the command to generate the first notification.

14. The apparatus of claim 11, further comprising a timer configured to indicate a particular value, wherein the processor is further configured to initiate the timer based on detecting the one or more conditions associated with delaying the one or more notifications at the plurality of devices and to detect the end of the timing window based on the particular value.

15. The apparatus of claim 11, wherein the one or more sensors are configured to detect user activity.

16. The apparatus of claim 11, further comprising:
an antenna; and
a transmitter coupled to the antenna and configured to transmit an encoded signal that includes the communication.

17. The apparatus of claim 16, further comprising a mobile device that includes the antenna, the transmitter, the memory, and the processor.

18. A non-transitory computer-readable medium storing instructions executable by a processor to initiate, perform, or control operations comprising:
detecting, by a first device of a plurality of devices, one or more conditions based at least in part on a sensor of the first device;
determining, based on the detecting, that one or more notifications are to be delayed at the plurality of devices;
in response to the determining, sending a communication to a second device of the plurality of device, the communication indicating a timing window during which notifications are to be delayed;
after sending the communication, receiving a first message at the first device;
responsive to receiving the first message and an end of the timing window, coordinating with the second device to determine a time to generate a first notification of the first message at the first device; and
generating the first notification of the first message at the first device at the determined time.

19. The non-transitory computer-readable medium of claim 18, wherein the communication indicates a particular time until which the one or more notifications are to be delayed, and wherein the timing window expires at the particular time.

20. The non-transitory computer-readable medium of claim 18, wherein detecting the one or more conditions includes identifying the second device via one or more of a short-range communication protocol, location information, or a contact list stored at the first device.

21. The non-transitory computer-readable medium of claim 18, wherein detecting the one or more conditions includes detecting at the first device one or more of a conversation of a first user or a social activity of the first user.

22. The non-transitory computer-readable medium of claim 18, wherein sending the communication causes the second device to delay generation of a second notification at the second device, the second notification different than the first notification.

23. The non-transitory computer-readable medium of claim 18, wherein the operations further comprise:
receiving a second message at the first device prior to the end of the timing window;
delaying generation of a second notification of the second message; and
generating the second notification of the second message, wherein an output order of the first notification and the second notification is based in part on content of one of the first message or the second message.

24. The non-transitory computer-readable medium of claim 23, wherein the output order is further based on an order of receipt of the first message and the second message.

25. The non-transitory computer-readable medium of claim 18, wherein the operations further comprise:
activating a timer at the first device at a beginning of the timing window; and
detecting the end of the timing window includes detecting that the timer indicates a particular value.

26. The non-transitory computer-readable medium of claim 18, wherein the operations further comprise:
after sending the communication and prior to detecting the end of the timing window, receiving a message from the second device indicating that the second device has detected a social activity;
based on receiving the message, extending the timing window; and
after extending the timing window, determining the end of the timing window based on a timer or in response to detecting termination of the social activity.

27. The non-transitory computer-readable medium of claim 18, wherein the operations further comprise:
receiving user input at the first device indicating a duration of the timing window; and
providing an indication of the duration of the timing window to the second device.

28. The non-transitory computer-readable medium of claim 18, wherein the first device corresponds to a mobile device.

29. An apparatus comprising:
means for storing instructions at a first device of a plurality of devices;
means for detecting one or more conditions at the first device;
means for executing the instructions at the first device to determine, based on the detecting the one or more conditions, that one or more notifications are to be delayed and to initiate a transmission of a communication to a second device, the communication indicating a timing window during which notifications are to be delayed; and
means for receiving a first message after transmission of the communication, wherein the means for executing the instructions is configured to coordinate with the second device, responsive to receiving the first message and an end of the timing window, to determine a time to generate a first notification of the first message at the first device, and generate the first notification at the first device at the determined time.

30. The apparatus of claim 29, wherein the means for storing and the means for executing are integrated into a mobile device.

* * * * *